March 19, 1963  R. C. STEELE ET AL  3,082,141
METHOD OF FORMING FLAT SECTIONS OF HONEYCOMB
STRUCTURE FROM PAPER STOCK
Filed March 7, 1960  2 Sheets-Sheet 1

INVENTORS
Roger C. Steele
Edwin L. Rule
BY
Townsend and Townsend
Attorneys

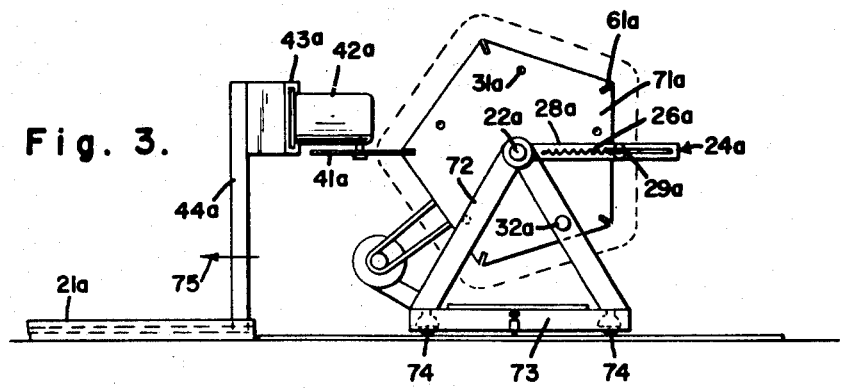
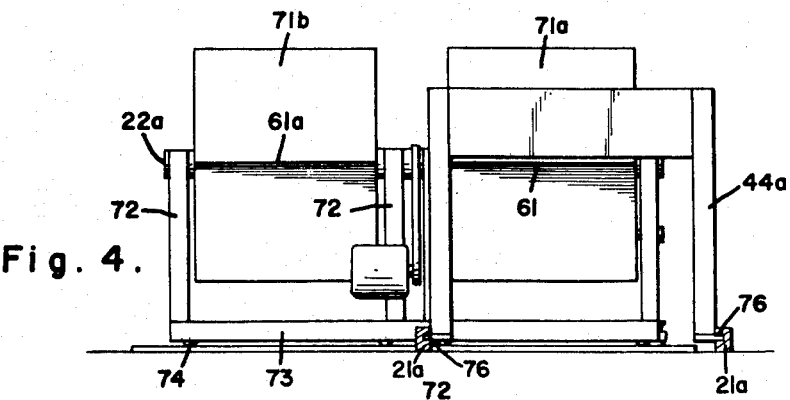
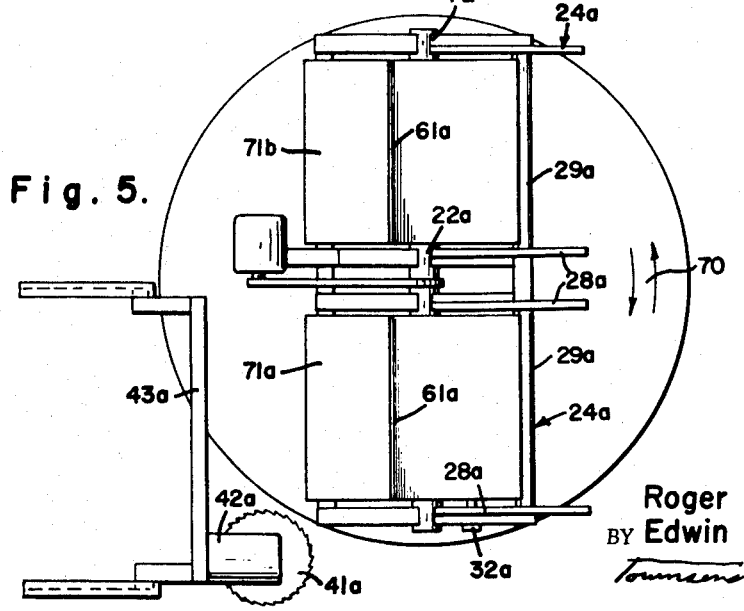
INVENTORS
Roger C. Steele
BY Edwin L. Rule

United States Patent Office 3,082,141
Patented Mar. 19, 1963

3,082,141
METHOD OF FORMING FLAT SECTIONS OF HONEYCOMB STRUCTURE FROM PAPER STOCK
Roger C. Steele, Oakland, and Edwin L. Rule, Berkeley, Calif., assignors to Hexcel Products Inc., Berkeley, Calif., a corporation of California
Filed Mar. 7, 1960, Ser. No. 13,258
2 Claims. (Cl. 156—189)

This invention relates to a process and apparatus for producing a honeycomb structure, and more particularly to a process for forming continuously layers of a relatively flat honeycomb structure from paper stock.

An object of the present invention is to provide an improved process and apparatus for manufacturing honeycomb.

In furtherance of this object, the present invention preferably employs a polygonic take-up reel supplied by a web formed for two continuous sheets of paper. One of the sheets is run through a glue unit to place transverse lines of glue on both sides thereof but at alternate intervals so that each sheet adheres to adjacent sheets as the web is wound on the polygon-shaped take-up reel. In addition to the improved flat sided take-up reel, there is provided means to hold the web firmly on the reel and to remove the unexpanded honeycomb after a predetermined number of layers of the web are wound thereon.

More specific features of the present invention pertain to various combinations of the polygonic take-up reel, supply rolls or sheets of paper, means for applying glue lines to the sides of at least one sheet, clamping means to press the web firmly against the take-up reel as it is wound thereon, and means for indexing the take-up reel, cutting the honeycomb and removing planar sections thereof.

In accordance with the objects and features set forth above, one exemplary embodiment or species of the present invention employs a substantially square cross-section take-up reel cooperating with a pair of supply reels, one of which courses a glue unit to provide the bonding agent between adjacent sheets of the paper. Co-operating with the square take-up reel are cutting means movable along the axis of the take-up reel to cut through the honeycomb formed on the reel thereby to facilitate its removal and clamping means operative to hold cut sections of the material firmly against the take-up reel during the cutting operation. Once the cutting operation has been completed, means may be provided for removing planar sections of the honeycomb for further operations consistent with the end use envisioned.

In a second exemplary embodiment or species of the present invention, a pair of pentagon shaped take-up reels are supported on a rotatable table so that the honeycomb formed on one may be removed by means similar to those employed in connection with the square take-up reel embodiment while a web is wound on the other.

The apparatus will be come clearly understood and these and other objects and features more fully appreciated when the following detailed description is read with reference to the drawings in which:

FIG. 3 is a partial side view schematic of the second embodiment of the invention employing a pair of pentagon-shaped take-up reels but with the supply reels, glue unit and clamping means omitted;

FIG. 4 is a left side view schematic of the second embodiment of FIG. 3;

FIG. 5 is a plan view schematic of the second embodiment of FIG. 3; and,

Figure 1:
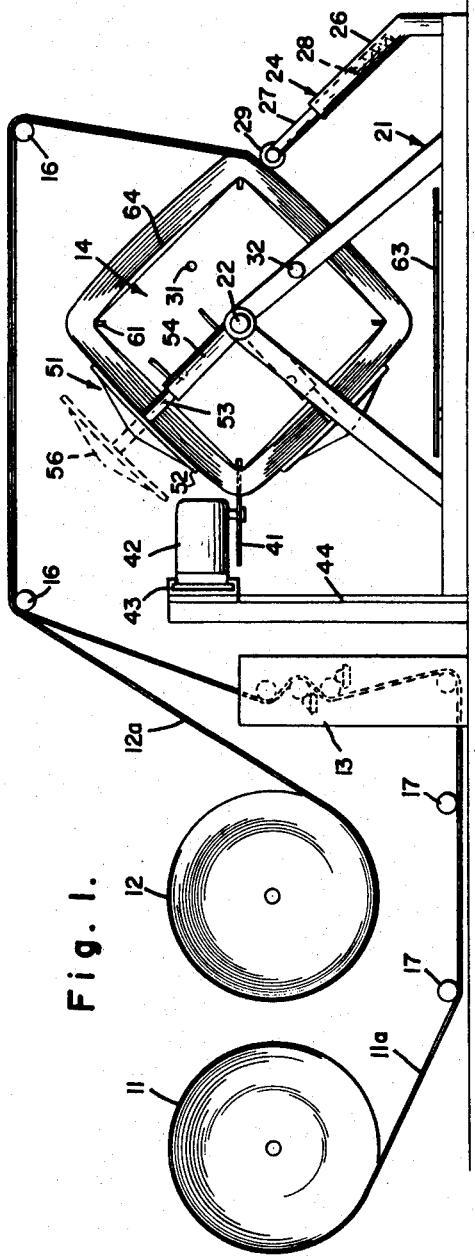
FIG. 1 is a side view schematic of the first embodiment of the invention employing a square take-up reel.
Figure 2:
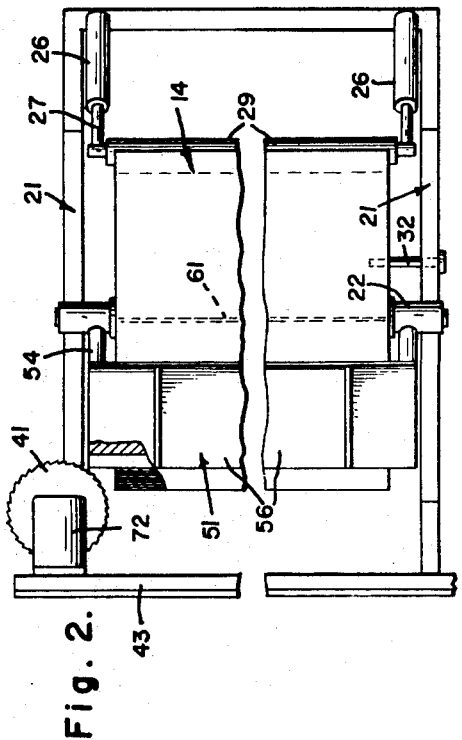
FIG. 2 is a plan view schematic of the apparatus of FIG. 1 but with the supply reels and glue unit omitted.

Looking first to the embodiment illustrated in FIGS. 1 and 2, the principal components include a pair of supply reels 11 and 12 and the square take-up reel 14. The sheets of paper on supply reels 11 and 12 are fed over guide rollers 16 to one side of the take-up reel 14 and, as the take-up reel 14 is rotated (by means not shown), the two-ply web of paper is wound on the take-up reel 14. The sheet of paper 11a on reel 11 is directed through a glue unit 13 by way of rollers 17 before passing over support rollers 16 adjacent sheet 12a. The glue unit 13 applies parallel transversely spaced, longitudinally extending lines of glue to opposite sides of paper 11a and with the lines of glue on opposite sides alternately staggered relative to one another. As the rolls of paper 11a and 12a come together over support rollers 16, they are wound on the take-up reel 14 and the unexpanded honeycomb material is formed.

The take-up reel 14 is supported by inverted V shaped frames 21 at each end and, as the take-up reel 14 is rotated in its journaled bearings 22, the two-ply web of paper is wound thereon. A spring-biased guide roller 24 is supported adjacent the take-up reel 14 in order to provide a positive pressure against the layers of web as they are wound on reel 14. The guide roller 24 includes a pair of supporting members 26, affixed to the frames 21, which cooperate with barrel members 27 biased in an outward or extended position by springs 28 which are disposed intermediate the barrel and the ends of the recesses in the frame members 26 in which they slide. A pivoted roller 29 is supported between the members 27 at opposite ends of the take-up reel 14, as is most clearly illustrated in FIG. 2.

After the desired number of layers of unexpanded honeycomb is formed on the square take-up reel 14, the reel 14 is rotated manually or automatically to position or index a corner properly so that the honeycomb may be cut along one corner of the reel 14. More specifically, apertures 31 are provided in the sides of the reel 14 and a pin 32, supported in one leg of one of the frame members 21, is slidable in a direction transverse to the movement of the paper to lock or index the reel 14 to the frames 21. Whenever the pin 32 is forced into one of the apertures 31, a corner of the reel 14 is oriented in proper juxtaposition to the blade 41 of a power saw 42, which cutting means is employed to cut the honeycomb preparatory to removing sections of it. The power saw 42 with its cooperating blade 41 is supported in a horizontal channel or track 43 disposed parallel to the axis of the take-up reel 14 and channel 43 is, in turn, supported by frame member 44 which is rigidly connected to the main frame 21.

After the take-up reel 14 is positioned for a cut, the power saw 42 is moved along a line parallel to the axis of rotation of the take-up reel 14 to cut the honeycomb along the corner. One or more clamps 51 are provided to hold sections of the honeycomb firmly against the reel 14 during the cutting and removing process. An exemplary clamp 51 includes a flat planar member 52 pivotally supported at each side of the reel 14 by piston members 53 which cooperate with barrels 54. Means (not shown) are provided to cause the piston member 53 to telescope into the barrels 54 in order to pull the flat member 52 firmly against the side of the honeycomb. The position of the clamping member 51 when not in use is indicated by the phantom view 56, whereas in its clamping position it is shown in full line (FIG. 1). With these clamps 51 firmly holding two sides of the honeycomb against the take-up reel 14, as illustrated in FIG. 1, the corners of the honeycomb may be successively cut by moving the power saw 42 along its horizontal track 43. Slots or grooves 61 are formed along each corner of the take-up reel 14, transverse to the lay of the paper, so that the cutting blade 41 may cut completely through a corner of the honeycomb without damaging the reel 14.

With the clamps 51 in place, the reel 14 is rotated successively 90° and the saw blade 41 used to cut the corners of the honeycomb. Once a section of the honeycomb has been cut, it is placed on a conveyor belt 63 which may transport it to another operational location. After one section of the honeycomb has been removed, it is necessary to pivot the clamps 51 so that the flat planar members 52 clamp other sections of the honeycomb preparatory to cutting and removing another section from the reel 14.

Figure 6:
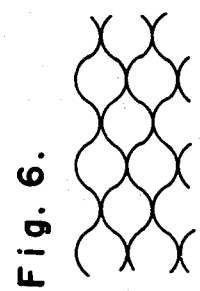
FIG. 6 illustrates an expanded cross section of the honeycomb formed by the present apparatus.

The honeycomb obtained by this process is illustrated in FIG. 6. The particular advantages of the exemplary embodiment of FIGS. 1 and 2 is that the honeycomb is formed at maximum speed in a continuous process with the end product being substantially planar, thereby minimizing the shortcomings of more or less circular take-up reels.

As can be seen in FIG. 1, the sides of the take-up reel 14 are slightly rounded as illustrated at 64 in order to facilitate removal of cut sections of honeycomb. It has been found that these slight curvatures 64 have no appreciable effect upon the uniformity and planar characteristics of the honeycomb, yet facilitate removal of the sections of the material from the square take-up reel 14.

Turning to the second exemplary embodiment or species, illustrated in FIGS. 3, 4 and 5, the supply rolls 11 and 12 have been omitted along with the glue unit 13, all of which may be similar to those illustrated in connection with the exemplary embodiment of FIGS. 1 and 2. Similar parts in the second exemplary embodiment have been given similar numbers with the subscript $a$ added to simplify the comparison. Pentagon shaped take-up reels 71a and 71b are supported in line in inverted V frames 72 disposed at opposite ends thereof in a manner similar to the support of square reel 14 by members 21; however, the frame members 72 are supported on a substantially horizontal support member or turntable 73 which may be pivoted in a horizontal plane (illustrated most clearly in FIG. 5). A plurality of pivoted bearings 74 support turntable 73 on the floor or other structure and the entire support structure may be rotated as illustrated by the arrows 70 (FIG. 5). In order to permit this, the power saw 42a is supported on a vertical frame 44a which is, in turn, slidably supported by the fixed frame 21a. As can be seen most clearly in FIG. 4, the vertical member 44a is slidably supported in the channels 76 formed in the frame member 21a so that the supporting vertical frame may be pulled away from its position at one end and behind the take-up reel 71a or 71b.

With the saw mechanism withdrawn in the direction of the arrow 75, the turntable 73 may be rotated 180° in order to position one or the other of the take-up reels 71a and 71b in position for forming honeycomb. For example, if honeycomb has been formed on the take-up reel 71a, the turntable 73 is rotated 180° in order to place the completed honeycomb adjacent the power saw 42a and to place the take-up reel 71b in proper juxtaposition to cooperate with supply reels and a glue unit (similar to those illustrated in FIG. 1). As the honeycomb is removed from the take-up reel 71a, another honeycomb may be wound on take-up reel 71b.

Turning more particularly to the difference between the pentagon shaped reel apparatus and the square reel apparatus, each pentagon shaped reel 71a, 71b has transverse slots 61a formed along each corner and there are provided apertures 31a to cooperate with a locking pin 32a, all in a manner similar to the operation of the first embodiment. A spring loaded pressure roller assembly 24a is provided which is pivotally supported at each end of the take-up reels 71a or 71b to hold the plies of paper firmly against adjacent layers as one of the take-up reels is rotated. Each pressure roller assembly 24a includes contracting roller 29a and coil springs 26a which cooperate to hold the roller 29a firmly against the honeycomb. The pressure roller assemblies 24a are not mounted to a fixed frame, as was the case with the square take-up reel apparatus, since it is necessary to rotate the unit as discussed above. As a result, the barrel members 28a, which are pivotally connected at each end of a reel 71a, 71b to shaft 22a, have the coil spring 26a connected at one set of their ends to the barrel members 28a and at the other set of their ends to the roller 29a, with the result that the springs tension the roller 29a firmly against the side of its take-up reel 71a or 71b.

The apparatus of FIGS. 3, 4 and 5 also requires the use of one or more clamp members which may be similar to those illustrated in the embodiment of FIG. 1.

By employing apparatus including polygonic take-up reels, as described above, it is possible to substantially improve the speed and configuration of the honeycomb material formed. While the invention has been described with particularity as to two types of take-up reels, it is apparent that other polygon shaped take-up reels may be employed without departing from the spirit and scope of the present invention. These, along with other modifications, will be apparent to those skilled in the art and so the invention should in no way be limited except to the extent of the appended claims.

What is claimed is:

1. A process for forming relatively flat sections of honeycomb made up of a plurality of layers of paper, each layer of which is adhered to ones adjacent thereto but at staggered intervals, comprising the steps of rotatably supporting at least two sheet supply rolls, applying a bonding agent at intervals to the cooperating surfaces of the layers of paper, winding plurality of layers of paper on a square take-up reel whereby each layer of material is adhered to those on each side at staggered intervals to form a multi-layer honeycomb structure, clamping at least one side of the formed honeycomb structure against the take-up reel, indexing a first corner of the take-up reel at a preselected position, cutting the honeycomb structure adjacent the first corner of the take-up reel, rotating the take-up reel by 90°, indexing a second corner of the take-up reel at the same preselected position, cutting the honeycomb structure adjacent the second corner of the take-up reel, and removing the portion of honeycomb between the cut corners.

2. A process for forming relatively flat sections of honeycomb made up of a plurality of layers of paper, each layer of which is adhered to ones adjacent thereto but at staggered intervals, comprising the steps of winding a plurality of layers of paper in turn on each one of a pair of polygonic take-up reels, whereby each layer of material on a reel is adhered to adjacent layers on each side at alternate intervals thereby to form multi-layer honeycomb structures on each reel, and removing the finished honeycomb structure from one reel by cutting it along adjacent corners of the reel to divide the structure into sections and removing the sections of honeycomb after they are divided while another honeycomb structure is being formed on the other reel.

References Cited in the file of this patent

UNITED STATES PATENTS

| 765,412 | Budwig | July 19, 1904 |
| 2,454,074 | Marc | Nov. 16, 1948 |
| 2,902,718 | Martelli et al. | Sept. 8, 1959 |

FOREIGN PATENTS

| 842,484 | Germany | June 26, 1952 |